(12) United States Patent
Chang et al.

(10) Patent No.: US 12,317,206 B2
(45) Date of Patent: May 27, 2025

(54) METHOD AND APPARATUS FOR TIMING ADJUSTMENT IN MOBILE COMMUNICATION SYSTEM

(71) Applicant: ELECTRONICS AND TELECOMMUNICATIONS RESEARCH INSTITUTE, Daejeon (KR)

(72) Inventors: Kapseok Chang, Daejeon (KR); Young-Jo Ko, Daejeon (KR); Cheul Soon Kim, Daejeon (KR); Yong Sun Kim, Daejeon (KR); Il Gyu Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 380 days.

(21) Appl. No.: 17/841,951

(22) Filed: Jun. 16, 2022

(65) Prior Publication Data

US 2022/0408387 A1  Dec. 22, 2022

(30) Foreign Application Priority Data

Jun. 17, 2021  (KR) .................. 10-2021-0078469
May 26, 2022  (KR) .................. 10-2022-0064561

(51) Int. Cl.
*H04W 56/00* (2009.01)

(52) U.S. Cl.
CPC ................ *H04W 56/001* (2013.01)

(58) Field of Classification Search
CPC ............. H04W 56/001; H04W 74/006; H04W 56/0045; H04W 56/0015; H04W 80/02; H04W 72/0446; H04W 72/1263
See application file for complete search history.

(56) References Cited

U.S. PATENT DOCUMENTS 10,771,999 B2   9/2020  Sanderovich et al.
10,869,309 B2   12/2020 Xiong
(Continued)

FOREIGN PATENT DOCUMENTS

KR  10-2020-0034737 A   3/2020
KR  20220168974 A  * 12/2022 ........ H04W 56/0005
(Continued)

OTHER PUBLICATIONS

"Positioning in LTE," in Handbook of Position Location: Theory, Practice, and Advances, IEEE, 2019, pp. 1165-1218, doi: 10.1002/9781119434610.ch32. keywords: {OFDM; Long Term Evolution; Microprocessors; Computer architecture; Protocols; Bandwidth; Transmitting antennas}, (Year: 2019).*

(Continued)

*Primary Examiner* — Ayaz R Sheikh
*Assistant Examiner* — Louis Samara
(74) *Attorney, Agent, or Firm* — LRK PATENT LAW FIRM

(57) ABSTRACT

A timing adjustment method performed by a terminal may include: acquiring downlink synchronization with a base station; obtaining, from the base station, TA granularity-related information; transmitting, to the base station, a preamble and/or an SRS; receiving, from the base station, a TA command generated based on the preamble and/or SRS; determining a timing for uplink frame transmission by interpreting the TA command based on a TA granularity determined based on the TA granularity-related information; and performing the uplink frame transmission based on the determined timing.

15 Claims, 9 Drawing Sheets

(56) References Cited

U.S. PATENT DOCUMENTS

| | | | |
|---|---|---|---|
| 11,032,816 B2 | 6/2021 | Akkarakaran et al. | |
| 2011/0241743 A1 | 10/2011 | Eum et al. | |
| 2014/0003416 A1 | 1/2014 | Kim et al. | |
| 2019/0053228 A1* | 2/2019 | Akkarakaran | H04W 72/0446 |
| 2019/0141697 A1 | 5/2019 | Islam et al. | |
| 2020/0245200 A1* | 7/2020 | Xiong | H04W 72/1263 |
| 2020/0267772 A1* | 8/2020 | Jung | H04W 74/006 |
| 2020/0413453 A1 | 12/2020 | Shao et al. | |
| 2021/0345272 A1* | 11/2021 | Chatterjee | H04W 80/02 |
| 2022/0039045 A1* | 2/2022 | Sun | H04W 56/0045 |
| 2022/0386261 A1* | 12/2022 | Park | H04W 56/0045 |

FOREIGN PATENT DOCUMENTS

| | | | | |
|---|---|---|---|---|
| KR | 20230007279 A * | 1/2023 | | H04W 56/0005 |
| WO | WO-2013023346 A1 * | 2/2013 | | G01S 11/02 |
| WO | 2019/048108 A1 | 3/2019 | | |
| WO | 2019/069240 A1 | 4/2019 | | |
| WO | WO-2023079506 A1 * | 5/2023 | | H04W 56/0015 |

OTHER PUBLICATIONS

KIPO Office Action, dated Aug. 15, 2022, for Korean Patent Application No. 10-2022-0064561 which corresponds to the above-identified U.S. application.

\* cited by examiner

METHOD AND APPARATUS FOR TIMING ADJUSTMENT IN MOBILE COMMUNICATION SYSTEM

CROSS-REFERENCE TO RELATED APPLICATIONS

This application claims priority to Korean Patent Applications No. 10-2021-0078469, filed on Jun. 17, 2021, and No. 10-2022-0064561 filed on May 26, 2022 with the Korean Intellectual Property Office (KIPO), the entire contents of which are hereby incorporated by reference.

BACKGROUND

1. Technical Field

The present disclosure relates to a timing adjustment (TA) method, and more particularly, to a method and an apparatus of improving granularity of a TA command transmitted by a base station to a terminal for reverse (uplink) synchronization in a mobile communication system.

2. Description of Related Art

In the conventional long-term evolution (LTE) or new radio (NR) mobile communication system, in order to establish uplink synchronization between a base station and a user equipment (UE), the base station may estimate a reception timing of each terminal by using a random access preamble (or non-contention based preamble in an RRC connected state) received from each terminal. The base station may transmit the estimated result to the terminal in form of a timing adjustment (TA) command. Each terminal receiving the TA command may transmit signals at a time earlier by a TA therefor to establish reverse synchronization (i.e., uplink) from the perspective of the base station.

The TA command is a command that causes the terminal to transmit its uplink frame at a time earlier by $TA \times 16T_s$ (i.e., a value obtained by multiplying a TA value by 16 $T_s$) than a synchronized frame start point estimated in downlink. Here, $T_s$ means a sample length corresponding to a 20 MHz bandwidth and a size 2046 of an inverse fast Fourier transform (IFFT).

As described above, $T_s$ may correspond to a basic unit defined according to a mobile communication system and correspond to 32.55 ns in the case of the LTE system. In this case, due to a discrete property of a TA step (i.e., 16 $T_s$), a propagation delay adjustment (i.e., TA) in the terminal may have a TA granularity error corresponding to a half of the TA step (i.e., 260 ns=32.55 ns×16/2).

SUMMARY

Accordingly, exemplary embodiments of the present disclosure are directed to providing a TA method having an improved granularity.

Accordingly, exemplary embodiments of the present disclosure are also directed to providing an apparatus performing a TA method having an improved granularity.

According to a first exemplary embodiment of the present disclosure, a timing adjustment (TA) method performed by a terminal may comprise: acquiring downlink synchronization with a base station; obtaining, from the base station, TA granularity-related information; transmitting, to the base station, a preamble and/or a sounding reference signal (SRS); receiving, from the base station, a TA command generated based on the preamble and/or SRS; determining a timing for uplink frame transmission by interpreting the TA command based on a TA granularity determined based on the TA granularity-related information; and performing the uplink frame transmission based on the determined timing.

The downlink synchronization may be acquired based on a synchronization signal or a reference signal transmitted from the base station.

The TA granularity may be determined by a TA command bit-width and/or a TA step.

The TA granularity-related information may include information on a cell size of the base station, application information, TA command bit-width, TA step, or a combination thereof.

The TA granularity-related information may include a configuration index indicating a cell size of the base station, application information, TA command bit-width, TA step, or a combination thereof.

A mapping relationship between the configuration index and the cell size of the base station, application information, TA command bit-width, TA step, or a combination thereof may be preconfigured in the terminal.

The TA granularity-related information may be received from the base station through a master information block (MIB) or at least one system information block (SIB), or received from the base station through higher layer signaling or a MAC control element (CE).

According to a second exemplary embodiment of the present disclosure, a timing adjustment (TA) method performed by a terminal may comprise: acquiring downlink synchronization with a base station; identifying TA granularity-related information; selecting a preamble and/or a sounding reference signal (SRS) corresponding to a TA granularity for the terminal based on the TA granularity-related information; transmitting the selected preamble and/or SRS to the base station; receiving, from the base station, a TA command generated based on the preamble and/or SRS; determining a timing for uplink frame transmission by interpreting the TA command based on the TA granularity corresponding to the selected preamble and/or SRS; and performing the uplink frame transmission based on the determined timing.

The downlink synchronization may be acquired based on a synchronization signal or a reference signal transmitted from the base station.

The TA granularity may be determined by a TA command bit-width and/or a TA step.

The TA granularity-related information may include a mapping relationship between {TA command bit-width, TA step} pairs to be applied to the terminal and preambles and/or sounding reference signals (SRSs), and may be preconfigured in the terminal.

The TA granularity-related information may include a configuration index indicating a preamble and/or SRS and a {TA command bit-width, TA step} pair to be applied to the terminal.

The TA granularity-related information may be received from the base station through a master information block (MIB) or at least one system information block (SIB), or received from the base station through higher layer signaling or a MAC control element (CE).

According to a third exemplary embodiment of the present disclosure, a timing adjustment (TA) method performed by a terminal may comprise: transmitting, to a base station, a TA request; receiving, from the base station, a TA response message including TA granularity-related information corresponding to the TA request; receiving a TA command from the base station; determining a timing for uplink frame transmission by interpreting the TA command based on a TA granularity determined by the TA granularity-related information; and performing the uplink frame transmission based on the determined timing.

The TA granularity may be determined by a TA command bit-width and/or a TA step.

The TA request may be transmitted through a physical uplink control channel (PUCCH) or a physical uplink shared channel (PUSCH).

The TA response message may be received through a physical downlink control channel (PDCCH), higher layer signaling, a medium access control (MAC) control element (CE), or a combination thereof.

The TA granularity-related information may include a TA value for the terminal or a terminal group to which the terminal belongs, a TA step therefor, a cell size of the base station, a distance between the base station and the terminal or the terminal group to which the terminal belongs, a TA command bit-width therefor, or a combination thereof.

When the TA granularity-related information includes the TA step, the TA granularity may be determined based on the TA step.

When the TA granularity-related information includes the distance between the base station and the terminal or the terminal group to which the terminal belongs, the TA granularity may be determined based on a TA step calculated based on the distance between the base station and the terminal or the terminal group to which the terminal belongs.

According to the exemplary embodiments of the present disclosure, a TA granularity error according to the specifications can be solved while minimizing additional resource usage. In addition, according to the exemplary embodiments of the present disclosure, the uplink timing performance can be improved by allowing the terminal to obtain a TA step optimized for itself through a TA request.

DETAILED DESCRIPTION OF THE EMBODIMENTS

Figure 1:
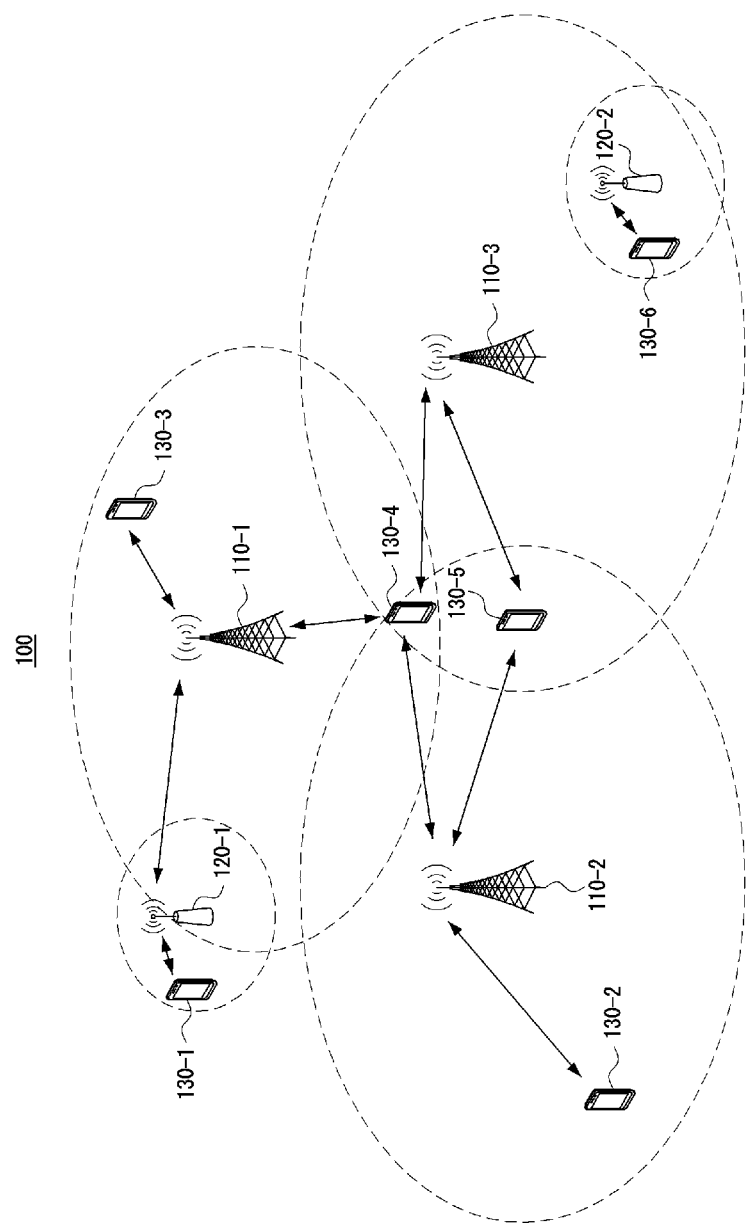
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
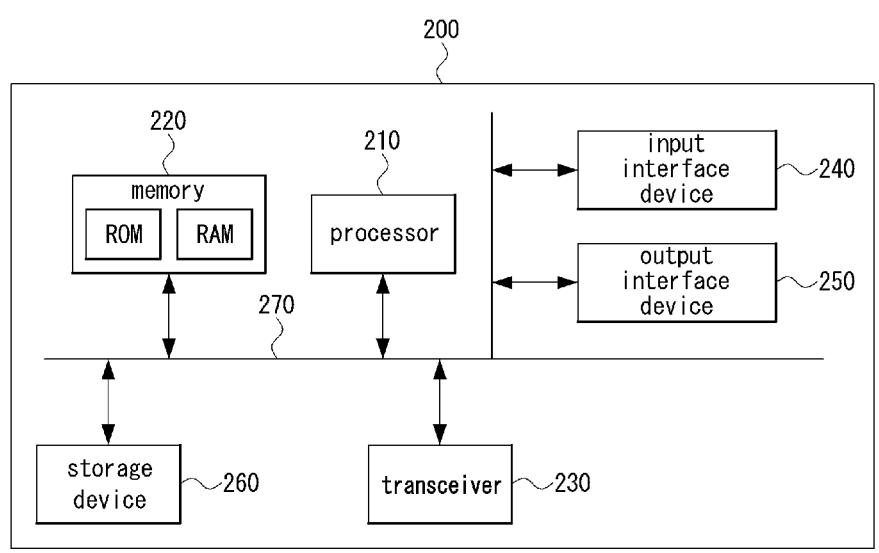
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multiinput multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
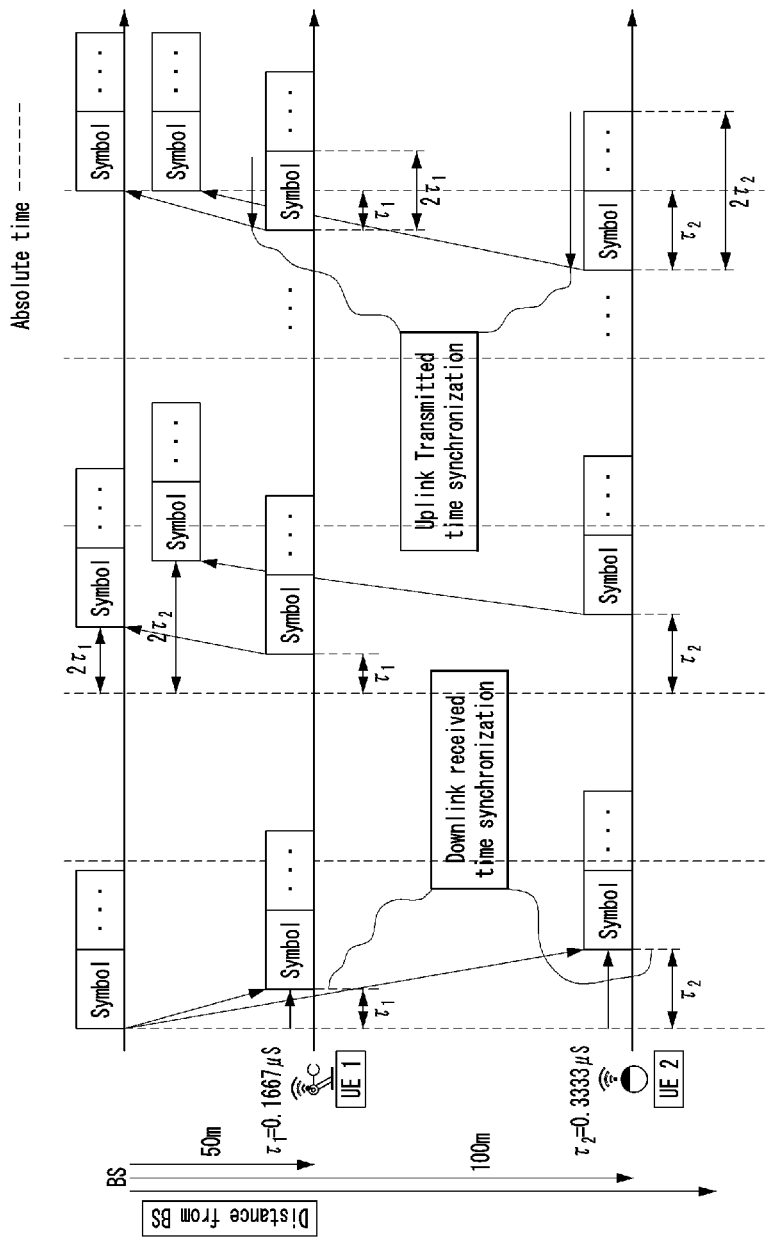
FIG. 3 is a conceptual diagram for describing an uplink synchronization procedure of a conventional mobile communication system.

FIG. 3 is a conceptual diagram for describing an uplink synchronization procedure of a conventional mobile communication system.

In the conventional LTE or NR mobile communication system, in order to establish uplink synchronization between a base station and a user equipment (UE), as shown in FIG. 3, the base station may estimate a reception timing $2\tau_1$ or $2\tau_2$ of each terminal (i.e., UE1 or UE2) by using a random access preamble (or non-contention based preamble in an RRC connected state) received from each terminal. The base station may transmit the estimated result to the terminal in form of a TA command. Each terminal (i.e., UE1 or UE2) receiving the TA command may transmit signals at a time earlier by a TA therefor to establish reverse synchronization (i.e., uplink) from the perspective of the base station.

In FIG. 3, $2\tau_1$ or $2\tau_2$ may mean a round-trip delay (RTD) experienced by the UE1 and UE2 respectively. The RTD value may be determined by a distance between the base station and the terminal. The above-described TA procedure may be performed both in a system access state, in which the terminal accesses the system, and in a system-connected state, in which the terminal is already connected to the system. In the case of the LTE system, in the system access state, as described above, the base station may estimates an RTD of the terminal by using a random access preamble (e.g., random access Msg 1) received from the terminal, and may transmit the estimated RTD to the terminal in form of a TA command (e.g., random access Msg 2). Here, the TA command (TAC) may have a granularity according to the size of 11 bits (or, 12 bits in the case of the NR system), and the TA may be expressed as TA∈{0, 1, ..., 1282}. Uplink synchronization in the NR system may also be performed similarly to that of the LTE system, so a detailed description thereof will be omitted here. The TA command is a command that causes the terminal to transmit its uplink frame at a time earlier by TA×16 $T_s$ (i.e., a value obtained by multiplying a TA value by 16 $T_s$) than a synchronized frame start point estimated in downlink. Here, $T_s$ means a sample length corresponding to a 20 MHz bandwidth and a size 2046 of an inverse fast Fourier transform (IFFT).

Meanwhile, in the system-connected state, the base station may periodically transmit a medium access control (MAC) control message including a TAC to the terminal in order to continuously maintain uplink synchronization with the terminal, thereby adjusting a transmission timing of uplink frames of the terminal. In this case, the TAC may have a granularity according to the size of 6 bits, and the TA may be expressed as TA∈{0, 1, ..., 63}. That is, the terminal receiving the TAC may adjust its uplink frame transmission timing by (TA−31)×16 $T_s$ from a current transmission timing.

As described above, $T_s$ may correspond to a basic unit defined according to a mobile communication system and correspond to 32.55 ns in the case of the LTE system. In this case, due to a discrete property of a TA step (i.e., 16 $T_s$), a propagation delay adjustment (i.e., TA adjustment) in the terminal may have a TA granularity error corresponding to a half of the TA step (i.e., 260 ns=32.55 ns×16/2). In addition, an uplink reception timing estimation error in the base station may be affected by rough radio channel conditions (especially, multipath propagation). If the TA granularity error and the uplink reception timing estimation error are destructively combined, there may occur a problem in that the uplink synchronization error is maximized. Since the current 4G LTE system and 5G NR system employ a timing-based positioning scheme, the same or more accurate synchronization performance as that for downlink is required in uplink for a higher positioning accuracy. Therefore, it is necessary to solve the TA granularity error according to the specifications while minimizing the use of additional resources.

Methods for minimizing the TA granularity error occurring in uplink synchronization from the perspective of the conventional base station may be broadly classified into two types. One is a standardization method by increasing a bit-width allocated to a TAC transmitted to the terminal. This method requires more resources than the conventional method. Another method is to minimize the TA granularity error experienced by the terminal by implicitly or explicitly reflecting a bit-width related information of the TAC in system information transmitted by the base station. Since the present disclosure is focused on minimizing the use of additional resources, the following methods are proposed.

First Exemplary Embodiment

Figure 4:
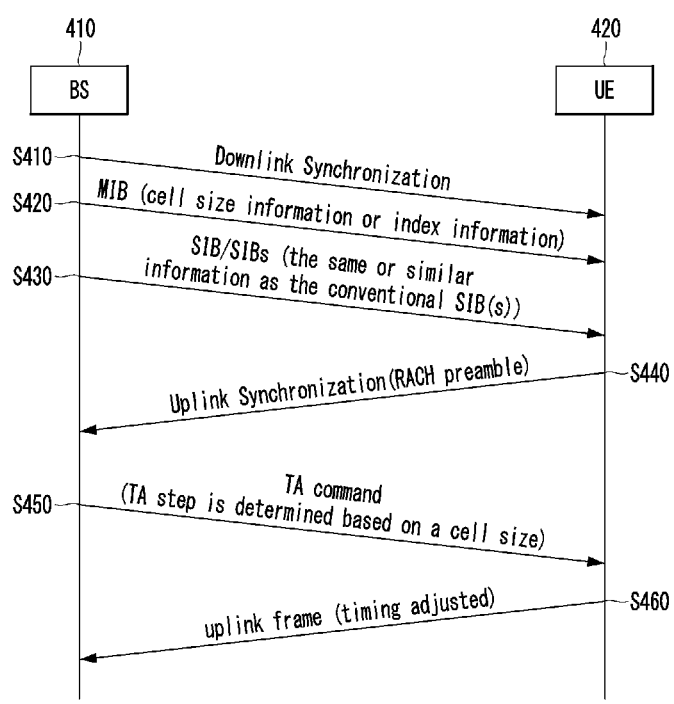
FIG. 4 is a sequence chart illustrating an improved timing adjustment method according to a first exemplary embodiment of the present disclosure.

FIG. 4 is a sequence chart illustrating an improved timing adjustment method according to a first exemplary embodiment of the present disclosure.

The system information (SI) transmitted by the base station may be divided into a master information block (MIB) fixedly transmitted as including a system bandwidth, a system frame number (SFN), and physical hybrid automatic repeat request (HARM) indication channel configuration information, and system information blocks (SIBs)

variably transmitted as including cell access restriction information, cell selection information, and other system-related information.

The improved timing adjustment method according to the first exemplary embodiment of the present disclosure is a method for improving a TA granularity without increasing a bit-width of a TAC. Referring to FIG. 4, a terminal 420 may acquire downlink synchronization from physical layer signal (s) such as a synchronization signal and a reference signal transmitted by a base station 410 (S410).

Then, the base station 410 may broadcast an MIB including cell size information (and/or application information) or index information indicating it (hereinafter, 'TA granularity-related information') to the terminal 420 (S420). Here, the application information refers to information that can be mapped explicitly/implicitly with the cell size when the cell size information is not directly provided or mapped. In this case, a one-to-one mapping relationship between the cell size information or a combination of the cell size information and the application information and a TA step (i.e., $T_{step}$) may be previously agreed between the base station and the terminal. A table (e.g., Tables 1 to 3 to be described later) defining such the mapping relationship may be preconfigured in the terminal. That is, the terminal 420 may determine a TA step $T_{step}$ to be used in subsequent TA procedures based on the cell size information or the combination of the cell size information and the application information.

Table 1 below is an example of defining the mapping relationship between the cell size and the TA step, Table 2 is an example of defining the mapping relationship between the application information and the TA step, and Table 3 is an example of defining the mapping between the combination of the cell size information and the application information and the TA step. The base station 410 may broadcast a configuration index corresponding to the cell size and/or application information to the terminal 420 through an MIB.

TABLE 1

| Configuration index | Cell size | TA step $T_{step}$ |
|---|---|---|
| 0 | Cell size x0 | TA step y0 |
| 1 | Cell size x1 | TA step y1 |
| 2 | Cell size x2 | TA step y2 |
| . | . | . |
| . | . | . |
| . | . | . |

TABLE 2

| Configuration index | Application information | TA step $T_{step}$ |
|---|---|---|
| 0 | Application x0 | TA step y0 |
| 1 | Application x1 | TA step y1 |
| 2 | Application x2 | TA step y2 |
| . | . | . |
| . | . | . |
| . | . | . |

TABLE 3

| Configuration index | Cell size | Application information | TA step $T_{step}$ |
|---|---|---|---|
| 0 | Cell size x0 | Application x0 | TA step y0 |
| 1 | Cell size x0 | Application x1 | TA step y1 |

TABLE 3-continued

| Configuration index | Cell size | Application information | TA step $T_{step}$ |
|---|---|---|---|
| 2 | Cell size x0 | Application x2 | TA step y2 |
| 3 | Cell size x1 | Application x0 | TA step y3 |
| 4 | Cell size x1 | Application x1 | TA step y4 |
| 5 | Cell size x1 | Application x2 | TA step y5 |
| . | . | . | . |
| . | . | . | . |
| . | . | . | . |

The base station 410 may minimize resource usage by broadcasting only the configuration index through the MIB in this manner.

Then, the terminal 420 may receive SIB(s) including the same or similar information as the conventional SIB(s) from the base station 410 (S430), and transmit a random access preamble to the base station through uplink (S440). The base station 410 may estimate an uplink timing of the terminal 420 based on the received random access preamble, and may transmit a TAC generated based on a TA granularity (i.e., TA step $T_{step}$) indicated by the configuration index transmitted to the terminal in step S420 (S450). Upon receiving the TAC from the base station 410, the terminal 420 may transmit an uplink frame at a time earlier by TA×$T_{step}$ instead of the conventional TA×16 $T_s$ based on the previously obtained TA step $T_{step}$ and the TA value included in the TAC (S460).

In the first exemplary embodiment, information for improving the TA granularity (i.e., TA granularity-related information) is reflected to the MIB, and the TA is measured using the random access preamble. However, various exemplary embodiments of the present disclosure are not limited thereto. For example, information for improving the TA granularity (i.e., TA granularity-related information) may be delivered to the terminal in form of higher layer signaling (e.g., radio resource control (RRC) signaling) or a MAC control element (MAC CE). In addition, the TA value may be measured using a sounding reference signal (SRS) or a combination of an SRS and a preamble instead of the random access preamble. For example, when the terminal attempts to access the base station, the TA value may be measured by a random access preamble, and when the terminal is connected to the base station, the TA value may be measured by an SRS or a combination of an SRS and a preamble.

Second Exemplary Embodiment

The first exemplary embodiment may be applied only to the preconfigured fixed cell size information and application information. As a method for solving this problem, a second exemplary embodiment according to the present disclosure will be described.

The second exemplary embodiment of the present disclosure may be applied together with or independently of the first exemplary embodiment. The second exemplary embodiment is a method of variably adjusting a TAC bit-width and a TA step $T_{step}$.

Figure 5:
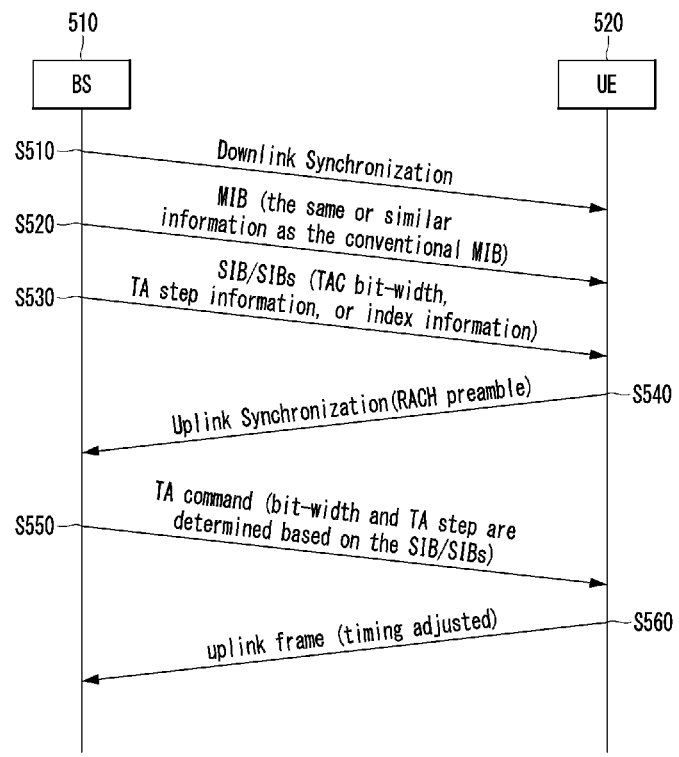
FIG. 5 is a sequence chart illustrating an improved timing adjustment method according to a second exemplary embodiment of the present disclosure.

FIG. 5 is a sequence chart illustrating an improved timing adjustment method according to a second exemplary embodiment of the present disclosure.

Referring to FIG. 5, a terminal 520 may acquire downlink synchronization from physical layer signal(s) such as a synchronization signal and a reference signal transmitted by a base station 510 (S510). Then, the base station 510 may broadcast an MIB including the same or similar information as that of the conventional MIB to the terminal 520 (S520).

Then, the base station 510 may broadcast a specific SIB or some SIB(s) including TA granularity-related information for improving a TA granularity to the terminal 520 (S520). The terminal 520 may obtain the TA granularity-related information from the specific SIB or some SIB(s), and may perform a TA preparation procedure for uplink synchronization. In this case, the TA granularity-related information and the TA preparation procedure performed by the terminal receiving the TA granularity-related information may be performed according to at least one of the following two schemes.

In the first scheme, a TAC bit-width may be fixed, and a configuration index according to Tables 1 to 3 described above may be broadcast as being included in a specific SIB or some SIB(s). Upon receiving this, the terminal may obtain information on a TA step mapped to the configuration index according to Tables 1 to 3 and prepare for a TA procedure.

In the second scheme, information on a TAC bit-width and information on a TA step may be broadcast as being included in a specific SIB or some SIB(s), or a configuration index indicating a TAC bit-width and a TA step may be broadcast as being included in a specific SIB or some SIB(s). For example, the configuration index may be defined as shown in Table 4 below. The terminal may obtain information on a TAC bit-width and a TA step mapped to the received configuration index, and prepare for a TA procedure. As in the first exemplary embodiment described above, a table (e.g., Table 4) defining the mapping relationship may be preconfigured in the terminal.

TABLE 4

| Configuration index | TAC bit-width | TA step $T_{step}$ |
|---|---|---|
| 0 | Bit-width x0 | TA step y0 |
| 1 | Bit-width x1 | TA step y1 |
| 2 | Bit-width x2 | TA step y2 |
| 3 | Bit-width x3 | TA step y3 |
| 4 | Bit-width x4 | TA step y4 |
| 5 | Bit-width x5 | TA step y5 |
| . | . | . |
| . | . | . |
| . | . | . |

In this manner, the base station 510 may minimize resource usage by broadcasting only a configuration index mapped to a TAC bit-width and a TA step through a specific SIB or some SIB(s).

Then, the terminal 520 may receive SIB(s) including the same or similar information as that of the conventional SIB(s) from the base station 510 (S530), and may transmit a random access preamble to the base station 510 through uplink (S540). The base station 510 may estimate an uplink timing of the terminal 520 based on a received random access preamble, and may transmit a TAC generated based on the TAC bit-width and/or TA step $T_{step}$ indicated by the configuration index transmitted in step S530 to the terminal (S550).

Upon receiving the TAC from the base station 510, the terminal 520 may transmit an uplink frame at a time earlier by TA×$T_{step}$ instead of the conventional TA×16 $T_s$ based on the TA value obtained according to the previously-obtained TAC bit-width and the TA step $T_{step}$ (S560).

In the second exemplary embodiment, information for improving the TA granularity (i.e., TA granularity-related information) is reflected to the specific SIB or some SIB(s), and the TA is measured using the random access preamble. However, various exemplary embodiments of the present disclosure are not limited thereto. For example, information for improving the TA granularity (i.e., TA granularity-related information) may be delivered to the terminal in form of higher layer signaling (e.g., RRC signaling) or a MAC CE. In addition, the TA value may be measured using an SRS or a combination of an SRS and a preamble instead of the random access preamble. For example, when the terminal attempts to access the base station, the TA value may be measured by a random access preamble, and when the terminal is connected to the base station, the TA value may be measured by an SRS or a combination of an SRS and a preamble.

Third Exemplary Embodiment

The second exemplary embodiment may be applied even when the size and application information of the serving cell are not fixed. However, the second exemplary embodiment does not provide a degree of freedom for a specific terminal to select an appropriate TA granularity (i.e., TA step and/or TAC bit-width) according to a situation. A third exemplary embodiment according to the present disclosure will be described as a method for solving this problem.

The third exemplary embodiment is a method in which a base station variably adjusts both a TAC bit-width and a TA step $T_{step}$ or adjusts a group of a TAC bit-width and a TA step, and a terminal can select a TAC bit-width and a TA step $T_{step}$ suitable for itself.

Figure 6:
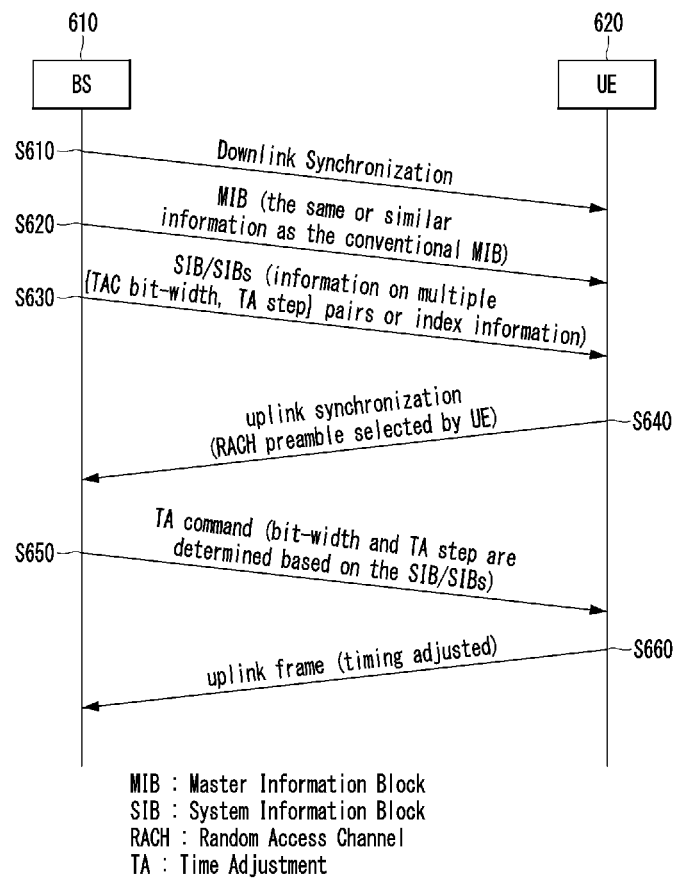
FIG. 6 is a sequence chart illustrating an improved timing adjustment method according to a third exemplary embodiment of the present disclosure.

FIG. 6 is a sequence chart illustrating an improved timing adjustment method according to a third exemplary embodiment of the present disclosure.

Referring to FIG. 6, a terminal 620 may acquire downlink synchronization from physical layer signal(s) such as a synchronization signal and a reference signal transmitted by a base station 610 (S610). Then, the base station 610 may broadcast an MIB including the same or similar information as that of the conventional MIB to the terminal 620 (S620).

Then, the base station 610 may transmit a specific SIB or some SIB(s) including information on a plurality of {TAC bit-width, TA step} pairs for a TAC or index information indicating the same (i.e., TA granularity-related information) to the terminal 620 (S630).

In this case, a mapping relationship between a single random access preamble or a plurality of random access preambles (i.e., a random access preamble group or set) and a {TAC bit-width, TA step} pair may be previously agreed between the base station and the terminal. That is, the terminal 620 may determine a {TAC bit-width, TA step} pair to be used in subsequent TA procedures based on a single random access preamble or a plurality of random access preambles. In this case, the mapping relationship between a single random access preamble or a plurality of random access preambles (i.e., random access preamble group or set) and a {TAC bit-width, TA step} pair may follow at least one of the following schemes.

In the first mapping scheme, a configuration index may be mapped to a random access preamble group and a {TAC bit-width, TA step} pair, and the specific SIB or some SIB(s) transmitted in step S630 may include the configuration index. Table 5 below is an example of defining a mapping relationship according to the first mapping scheme.

TABLE 5

| Configuration index | Random access preambles | TAC bit-width | TA step $T_{step}$ |
|---|---|---|---|
| 0 | Preambles x0~x3 | Bit-width y0 | TA step z0 |
| 1 | Preambles x4~x7 | Bit-width y4 | TA step z4 |
| 2 | Preambles x8~x11 | Bit-width y8 | TA step z8 |
| 3 | Preambles x12~x15 | Bit-width y12 | TA step z12 |
| 4 | Preambles x16~x19 | Bit-width y16 | TA step z16 |
| 5 | Preambles x20~x23 | Bit-width y20 | TA step z20 |
| . | . | . | . |
| . | . | . | . |
| . | . | . | . |

In the second mapping scheme, a configuration index may be mapped to a random access preamble group, a {TAC bit-width, TA step} pair, and application information. Through this, the terminal may more efficiently select a preamble (i.e., a preamble corresponding to a {TAC bit-width, TA step} pair). The specific SIB or some SIB(s) transmitted in step S630 may include the configuration index. Table 6 below is an example of defining a mapping relationship according to the second mapping scheme.

TABLE 6

| Configuration index | Application information | Random access preambles | TAC bit-width | TA step $T_{step}$ |
|---|---|---|---|---|
| 0 | Application 0 | Preambles x0~x3 | Bit-width y0 | TA step z0 |
| 1 | Application 1 | Preambles x4~x7 | Bit-width y4 | TA step z4 |
| 2 | Application 2 | Preambles x8~x11 | Bit-width y8 | TA step z8 |
| 3 | Application 3 | Preambles x12~x15 | Bit-width y12 | TA step z12 |
| 4 | Application 4 | Preambles x16~x19 | Bit-width y16 | TA step z16 |
| 5 | Application 5 | Preambles x20~x23 | Bit-width y20 | TA step z20 |
| . | . | . | . | . |
| . | . | . | . | . |
| . | . | . | . | . |

Although one application is mapped to a random access preamble group in Table 6, various exemplary embodiments of the present disclosure are not limited thereto. That is, the same application may be mapped to a plurality of preamble groups. In addition, various exemplary embodiments of the present disclosure are not limited to Tables 5 and 6 above, and various other mapping schemes between application information, random access preamble group(s), and {TAC bit-width, TA step} pair(s) may be applied.

Then, the terminal 620 may determine a {TAC bit-width, TA step} pair (i.e., a preamble group or application mapped thereto) for TACs to be used for its uplink synchronization based on its capability and preferred applications. Thereafter, the terminal 620 may transmit a preamble randomly selected from among preambles belonging to the determined preamble group to the base station 610 (S640).

Meanwhile, the base station 610 may estimate an uplink timing for random access preambles mapped to all {TAC bit-width, TA step} pairs defined in Tables 5 and 6 in a blind manner. The base station may estimate an uplink timing of the terminal 620 based on a random access preamble received from the terminal 620, identify a {TAC bit-width, TA step} pair to be applied to the terminal based on the TA granularity-related information transmitted to the terminal in step S630 and the random access preamble received from the terminal 620, and transmit a TAC generated based on the identified {TAC bit-width, TA step} pair to the terminal 620 (S650).

Upon receiving the TAC from the base station 610, the terminal 620 may transmit an uplink frame at a time earlier by TA×$T_{step}$ instead of the conventional TA×16 $T_s$ based on the TA value according to the TAC bit-width and the TA step $T_{step}$ corresponding to the random access preamble transmitted by itself (S660).

In the third exemplary embodiment, a random access preamble or random access preamble group is mapped only to application information and a {TAC bit-width, TA step} pair. However, various exemplary embodiments of the present disclosure are not limited thereto. For example, in Table 5 and Table 6, a different time/frequency resource may be mapped to each configuration index in order to avoid collision between terminals simultaneously performing random access.

In the third exemplary embodiment, information for improving the TA granularity (i.e., TA granularity-related information) is reflected to the specific SIB or some SIB(s), and the TA is measured using the random access preamble. However, various exemplary embodiments of the present disclosure are not limited thereto. For example, information for improving the TA granularity (i.e., TA granularity-related information) may be delivered to the terminal in form of higher layer signaling (e.g., RRC signaling) or a MAC CE. In addition, the TA value may be measured using an SRS or a combination of an SRS and a preamble instead of the random access preamble. For example, when the terminal attempts to access the base station, the TA value may be measured by a random access preamble, and when the terminal is connected to the base station, the TA value may be measured by an SRS or a combination of an SRS and a preamble.

Fourth Exemplary Embodiment

In the prior arts, the base station transmits a TA value through a broadcast message, but in an exemplary embodiment according to the present disclosure, the base station may deliver, to a terminal, a message including an appropriate TA value, a TA step, a cell size of the base station, a distance between the terminal and the base station, a TAC bit-width, and/or the like according to a request of the terminal.

That is, according to an exemplary embodiment of the present disclosure, the terminal may transmit a TA request message to the base station by using a physical uplink control channel (PUCCH) or a physical uplink shared channel (PUSCH). Accordingly, the base station may transmit, to the terminal, one or more information (i.e., TA granularity-related information) among a TA value and/or TA step appropriate for the terminal, a cell size of the base station, a distance between the base station and the terminal (or a group to which the terminal belongs), a TAC bit-width, and/or the like, or a value generated by a combination of the values as a response message.

Figure 7:
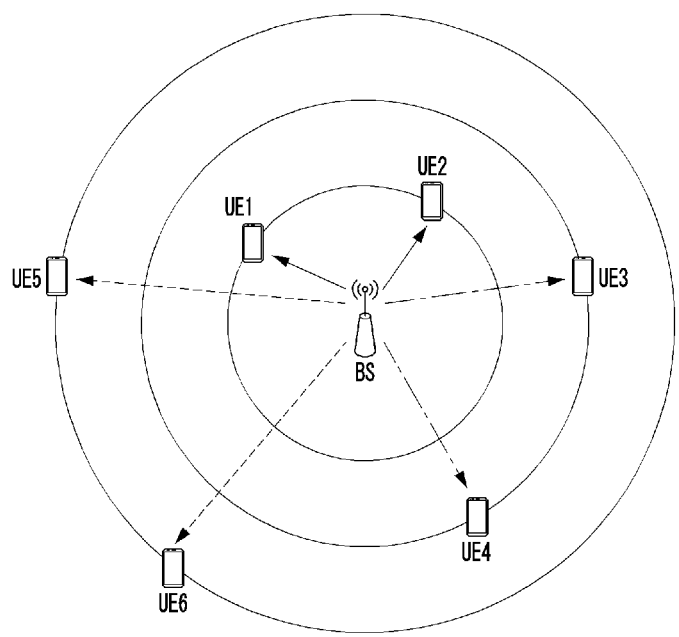
FIG. 7 is a conceptual diagram for describing an improved timing adjustment method according to a fourth exemplary embodiment of the present disclosure.

FIG. 7 is a conceptual diagram for describing an improved timing adjustment method according to a fourth exemplary embodiment of the present disclosure.

Referring to FIG. 7, when grouping terminals located at similar distances from a base station (BS), terminals UE1 and UE2 may belong to a group 1, terminals UE3 and UE4 may belong to a group 2, and terminals UE5 and UE6 may belong to a group 3. In an initial access phase, terminals belonging to all groups may receive TACs having the same granularity. Even when the base station-based improved timing adjustment methods described through the first to third exemplary embodiments described above are applied, the TA granularity that all terminals initially have may be the same.

However, if the terminals belonging to the group 1, group 2, and group 3 use different TA granularities, uplink timing performance may be further improved. For example, when a smaller TA step is given to a terminal group located close to the base station, the timing of terminals belonging to the group can be more precisely adjusted with a smaller granularity, and accordingly, the uplink timing performance can be improved.

The base station may set the number of groups to be the same as the number of terminals existing within coverage by adjusting the number of groups classified according to distances. In this case, when the number of groups coincides with the number of terminals, a different TA granularity may be configured for each of the terminals. Alternatively, the base station may group all terminals existing within the cell coverage into one group so that all terminals operate according to a single TA step.

Figure 8:
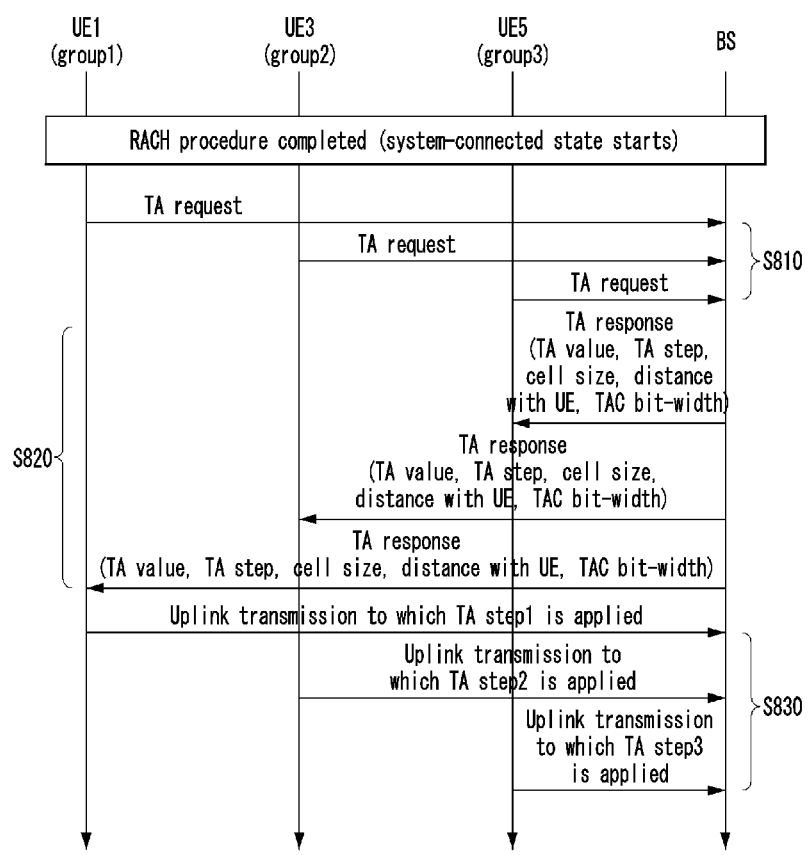
FIG. 8 is a sequence chart illustrating an improved timing adjustment method according to the fourth exemplary embodiment of the present disclosure based on the arrangement of terminals shown in FIG. 7.

FIG. 8 is a sequence chart illustrating an improved timing adjustment method according to the fourth exemplary embodiment of the present disclosure based on the arrangement of terminals shown in FIG. 7.

Referring to FIG. 8, the terminal UE1 belonging to the group 1, the terminal UE2 belonging to the group 2, and terminal the UE3 belonging to the group 3 may each transmit a TA request message to the base station BS (S810). The base station may provide, to each terminal, a TA response message including information such as a TA value and/or a TA step appropriate for each terminal (or, group to which each terminal belongs), a cell size of the base station, a distance between the base station and the terminal (or group to which the terminal belongs), a TAC bit-width, and/or the like (i.e., TA granularity-related information) (S820). That is, the base station may determine a TA step for each group, and transmit a TA response message including the determined TA step to the terminal(s) belonging to each group.

Meanwhile, the TA response message may be transmitted to the terminal(s) by using a physical downlink control channel (PDCCH), higher layer signaling (e.g., RRC signaling), MAC CE, or a combination thereof.

Meanwhile, if the same TA step is to be applied to all terminals within the cell coverage, the base station may group all terminals within the cell coverage into one group and include the same TA step value in the TA response messages transmitted to the respective terminals. When the base station transmits a TA response message including information on a distance between the base station and the terminal instead of the TA step value, the TA value provided by the base station should be information updated based on the distance between the base station and the terminal. In this case, the base station may transmit a TA response message including information generated based on a portion of the above-described information (i.e., TA value, TA step, cell size, distance between the terminal and the base station, and TAC bit-width) or a combination thereof.

Each terminal receiving the TA response message may perform uplink transmission by applying its assigned TA step value. In FIG. 8, the terminal UE1 belonging to the group 1 closest to the base station performs uplink transmission based on a TA step1, the terminal UE3 belonging to the second farthest group 2 from the base station performs uplink transmission based on a TA step2, and the terminal UE5 belonging to the farthest group 3 may perform uplink transmission based on a TA step3. In this case, a relationship of (TA step1<TA step2<TA step3) is established.

When the TA response message includes information on the distance between the base station and the terminal (or group to which the terminal belongs), not the TA step value, each terminal may calculate a TA step to be used by using the distance included in the received TA response message. In this case, each terminal may have various TA steps according to the distance between the base station and the terminal.

Meanwhile, an exemplary embodiment of the present disclosure may include a combination of at least two or more of the first to fourth exemplary embodiments described above. For example, after terminals belonging to each group obtain information on the TA step, cell size, and/or TAC bit-width from the base station according to any one of the first to third exemplary embodiments, additional TA granularity improvement may be required for each terminal. In this case, it is possible to improve the TA granularity by transmitting a TA request message to the base station.

Figure 9:
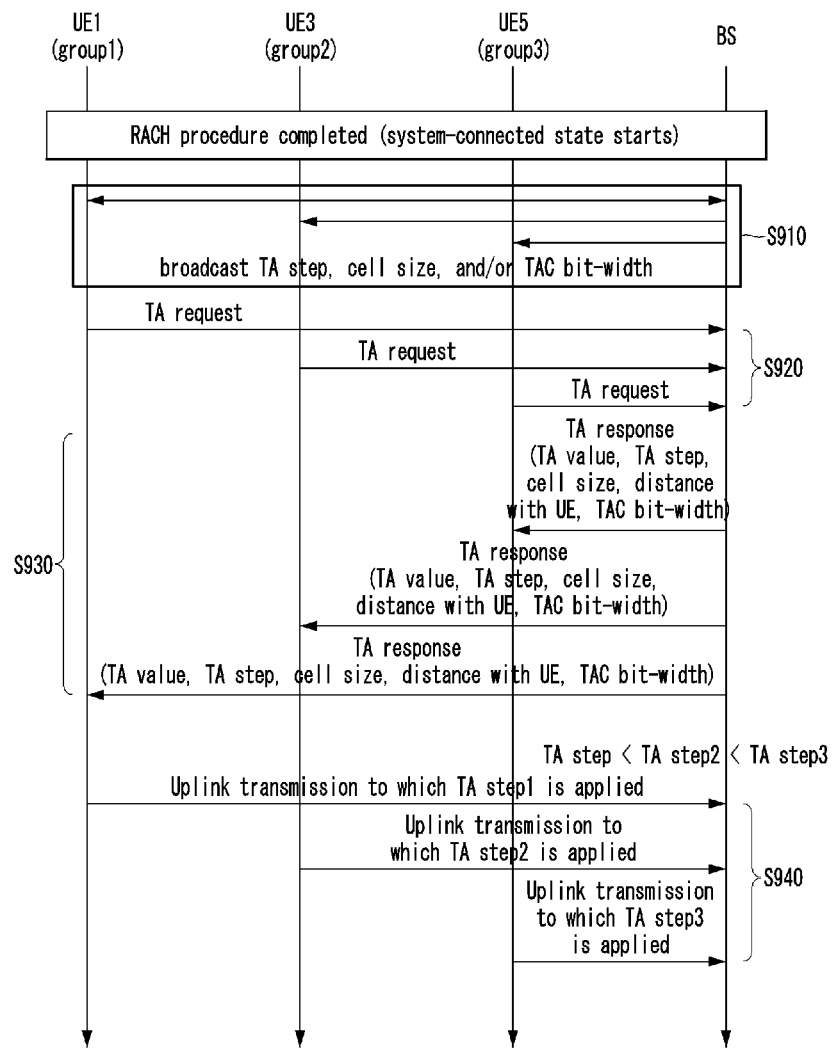
FIG. 9 is a sequence chart for describing an exemplary embodiment in which various exemplary embodiments according to the present disclosure are combined.

FIG. 9 is a sequence chart for describing an exemplary embodiment in which various exemplary embodiments according to the present disclosure are combined.

Referring to FIG. 9, terminals belonging to each group may obtain information such as a TA step, a TAC bit-width, and/or a cell size from the base station (S910). In the system-connected state, the terminal may additionally transmit a TA request message to the base station for more accurate uplink timing (S920). In this case, the base station may transmit, to each terminal (each group), information generated based on a TA step, cell size, distance between the base station and the terminal, or TAC bit-width corresponding to the group to which each terminal belongs or information generated based on a combination thereof as a TA response message (S930). Each terminal receiving the TA response message may perform uplink transmission by using the information included in the TA response message (S940).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A timing adjustment (TA) method performed by a terminal, comprising:
   acquiring downlink synchronization with a base station;
   obtaining, from the base station, TA granularity-related information;
   transmitting, to the base station, a preamble and/or a sounding reference signal (SRS);
   receiving, from the base station, a TA command generated based on the preamble and/or SRS;
   determining a timing for uplink frame transmission by interpreting the TA command based on a TA granularity determined based on the TA granularity-related information; and
   performing the uplink frame transmission based on the determined timing,
   wherein the TA granularity-related information includes a configuration index indicating a cell size of the base station, application information, TA command bit-width, TA step, or a combination thereof, and
   wherein a mapping relationship between the configuration index and the cell size of the base station, application information, TA command bit-width, TA step, or a combination thereof is preconfigured in the terminal.

2. The TA method according to claim 1, wherein the downlink synchronization is acquired based on a synchronization signal or a reference signal transmitted from the base station.

3. The TA method according to claim 1, wherein the TA granularity is determined by a TA command bit-width and/or a TA step.

4. The TA method according to claim 1, wherein the TA granularity-related information includes information on a cell size of the base station, application information, TA command bit-width, TA step, or a combination thereof.

5. The TA method according to claim 1, wherein the TA granularity-related information is received from the base station through a master information block (MIB) or at least one system information block (SIB), or received from the base station through higher layer signaling or a MAC control element (CE).

6. A timing adjustment (TA) method performed by a terminal, comprising:
   acquiring downlink synchronization with a base station;
   identifying TA granularity-related information;
   selecting a preamble and/or a sounding reference signal (SRS) corresponding to a TA granularity for the terminal based on the TA granularity-related information;
   transmitting the selected preamble and/or SRS to the base station;
   receiving, from the base station, a TA command generated based on the preamble and/or SRS;
   determining a timing for uplink frame transmission by interpreting the TA command based on the TA granularity corresponding to the selected preamble and/or SRS; and
   performing the uplink frame transmission based on the determined timing,
   wherein the TA granularity-related information includes a configuration index indicating a preamble and/or SRS and a pair of a TA command bit-width and a TA step to be applied to the terminal.

7. The TA method according to claim 6, wherein the downlink synchronization is acquired based on a synchronization signal or a reference signal transmitted from the base station.

8. The TA method according to claim 6, wherein the TA granularity is determined by a TA command bit-width and/or a TA step.

9. The TA method according to claim 6, wherein the TA granularity-related information includes a mapping relationship between pairs each comprising a TA command bit-width and a TA step to be applied to the terminal and preambles and/or sounding reference signals (SRSs), and is preconfigured in the terminal.

10. The TA method according to claim 6, wherein the TA granularity-related information is received from the base station through a master information block (MIB) or at least one system information block (SIB), or received from the base station through higher layer signaling or a MAC control element (CE).

11. A timing adjustment (TA) method performed by a terminal, comprising:
    transmitting, to a base station, a TA request;
    receiving, from the base station, a TA response message including TA granularity-related information corresponding to the TA request;
    receiving a TA command from the base station;
    determining a timing for uplink frame transmission by interpreting the TA command based on a TA granularity determined by the TA granularity-related information; and
    performing the uplink frame transmission based on the determined timing,
    wherein the TA granularity-related information includes a configuration index indicating a TA value for the terminal or a terminal group to which the terminal belongs, a TA step therefor, a cell size of the base station, a distance between the base station and the terminal or the terminal group to which the terminal belongs, a TA command bit-width therefor, or a combination thereof, and
    wherein a mapping relationship between the configuration index and the TA value for the terminal or the terminal group to which the terminal belongs, the TA step therefor, the cell size of the base station, the distance between the base station and the terminal or the terminal group to which the terminal belongs, the TA command bit-width therefor, or a combination thereof is preconfigured in the terminal.

12. The TA method according to claim 11, wherein the TA granularity is determined by a TA command bit-width and/or a TA step.

13. The TA method according to claim 11, wherein the TA request is transmitted through a physical uplink control channel (PUCCH) or a physical uplink shared channel (PUSCH).

14. The TA method according to claim 11, wherein the TA response message is received through a physical downlink control channel (PDCCH), higher layer signaling, a medium access control (MAC) control element (CE), or a combination thereof.

15. The TA method according to claim 11, wherein the TA granularity-related information includes a TA value for the terminal or a terminal group to which the terminal belongs, a TA step therefor, a cell size of the base station, a distance between the base station and the terminal or the terminal group to which the terminal belongs, a TA command bit-width therefor, or a combination thereof.

* * * * *